J. G. TREADWELL.
Gridiron.
No. 26,539. Patented Dec. 20, 1859.
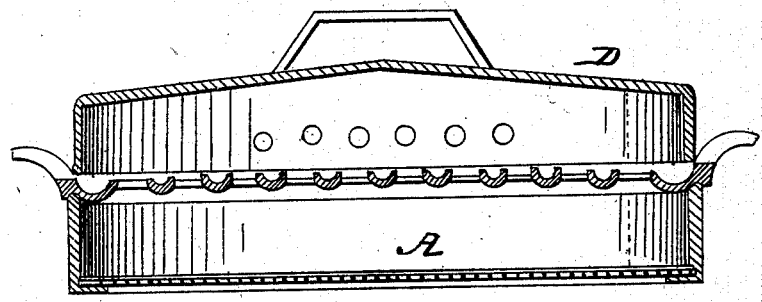
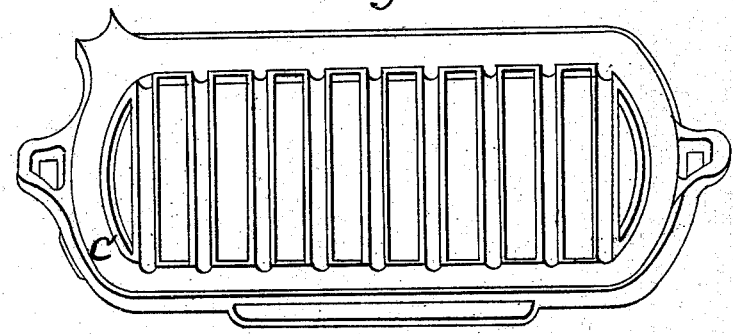
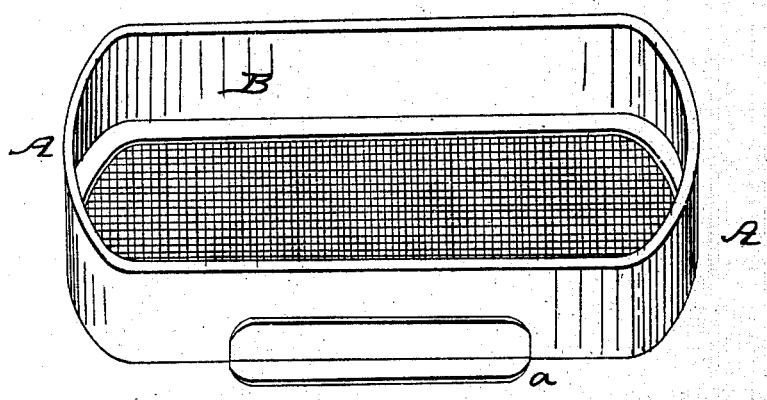

United States Patent Office.

JOHN G. TREADWELL, OF ALBANY, NEW YORK.

IMPROVEMENT IN GRIDIRONS.

Specification forming part of Letters Patent No. 26,539, dated December 20, 1859.

*To all whom it may concern:*

Be it known that I, JOHN G. TREADWELL, of Albany, in the county of Albany and State of New York, have invented certain new and useful Improvements in Gridirons; and I do hereby declare that the following is a full, clear, and exact description of the same, reference being had to the accompanying drawings, and to the letters of reference marked thereon.

The nature of my invention consists in the employment of a gauze-wire screen or its equivalent, when the same is used in combination with an ordinary gridiron, substantially in the manner hereinafter described.

In the annexed drawings, Figure 1 represents a longitudinal vertical section. Fig. 2 is a perspective of the frame. Fig. 3 is a view of the gridiron detached.

In the figures, B represents a frame which is made of metal and of any suitable size to fit upon the particular stove with which it is to be used, said frame being provided on each side with flanges $a$, which rest upon the top of the stove and support the frame. The frame is also provided with a gauze-wire bottom A, which is secured to said frame in any suitable and convenient manner.

C represents an ordinary gridiron, which is constructed in any of the known ways and made to fit snugly on top of the frame B.

D represents a cover, which is placed over the gridiron and upon top of the frame when the operation of broiling is going on.

In using this invention the front covers of the stove over the fire are removed, and the frame B is set upon the stove, resting upon and being supported by means of the flanges $a$. The gridiron is then placed upon top of the frame, and the meat to be broiled being placed upon it the cover D is placed in proper position over the gridiron. The heat from the fire passes up through the gauze-wire bottom and cooks the meat, while the gases or smoke arising from the fire pass around the wire-gauze and up the smoke-pipe. One of the principal advantages arising from this arrangement is that the meat is protected from the gases and smoke of the fire.

When meat is broiled over the fire, the fatty parts generally melt and run down, thus causing a flame as they are burned, which comes in contact with the meat and either scorches or smokes it. By my arrangement this difficulty is also remedied.

Having thus described my improvements in gridirons, what I claim therein as new, and desire to secure by Letters Patent of the United States, is—

The employment of the gauze-wire screen A or its equivalent, the gridiron C, and the cover D, when the same are used substantially as and for the purpose specified.

JNO. G. TREADWELL.

Witnesses:
S. T. SAVAGE,
SAMUEL G. CONE.